US012006157B2

(12) United States Patent
Katterfeld et al.

(10) Patent No.: US 12,006,157 B2
(45) Date of Patent: Jun. 11, 2024

(54) METHOD AND MEASUREMENT SYSTEM FOR DETECTING AND LOCALIZING INCORRECT POSITIONING OF SUPPORT ROLLERS IN BELT CONVEYOR INSTALLATIONS

(71) Applicant: OTTO-VON-GUERICKE-UNIVERSITAT MAGDEBURG, Magdeburg (DE)

(72) Inventors: Andre Katterfeld, Magdeburg (DE); Hendrik Otto, Wolfsburg (DE); Lisa Wonner, Magdeburg (DE)

(73) Assignee: OTTO-VON-GUERICKE-UNIVERSITAT MAGDEBURG, Magdeburg (DE)

( * ) Notice: Subject to any disclaimer, the term of this patent is extended or adjusted under 35 U.S.C. 154(b) by 157 days.

(21) Appl. No.: 17/762,071

(22) PCT Filed: Sep. 24, 2020

(86) PCT No.: PCT/EP2020/076783
§ 371 (c)(1),
(2) Date: Mar. 20, 2022

(87) PCT Pub. No.: WO2021/058682
PCT Pub. Date: Apr. 1, 2021

(65) Prior Publication Data
US 2022/0371827 A1    Nov. 24, 2022

(30) Foreign Application Priority Data
Sep. 26, 2019 (DE) .......................... 102019126060.4

(51) Int. Cl.
B65G 43/00    (2006.01)
B65G 39/12    (2006.01)
(Continued)

(52) U.S. Cl.
CPC ............. *B65G 43/02* (2013.01); *B65G 39/12* (2013.01); *G01L 1/22* (2013.01)

(58) Field of Classification Search
CPC ................................ B65G 39/16; B65G 43/02
(Continued)

(56) References Cited

U.S. PATENT DOCUMENTS 7,353,937 B2 * 4/2008 Ziegler .................. B65G 43/02
                                                                                       198/810.04
7,673,739 B2 * 3/2010 Freeman ................ B65G 43/02
                                                                                       198/810.01
(Continued)

FOREIGN PATENT DOCUMENTS

DE        19911640 A1    9/2000
DE        19911642 A1    9/2000
(Continued)

OTHER PUBLICATIONS

Liu, Xiangwei et al., "Quantification of the pressure distribution on a loaded conveyor belt using a tactile pressure sensor," In: Proceedings of the XXI international conference MHCL'15, Sep. 23-25, 2015, Vienna Austria, 2015, S. 1-7.

*Primary Examiner* — Leslie A Nicholson, III
(74) *Attorney, Agent, or Firm* — Hinckley Allen & Snyder, LLP; Stephen Holmes

(57) ABSTRACT

The invention relates to a method and to a measurement system for determining and localizing incorrect positioning of support rollers (1) in support roller stations (13) of belt conveyor installations, wherein a unit of pressure sensors (4) is detachably mounted on the underside of a conveyor belt (2); the number of pressure sensors (4) corresponds at least to the number of support rollers (1) of a support roller station (13); and as the sensor (4) is led over a support roller (1), a
(Continued)

Figure 1:
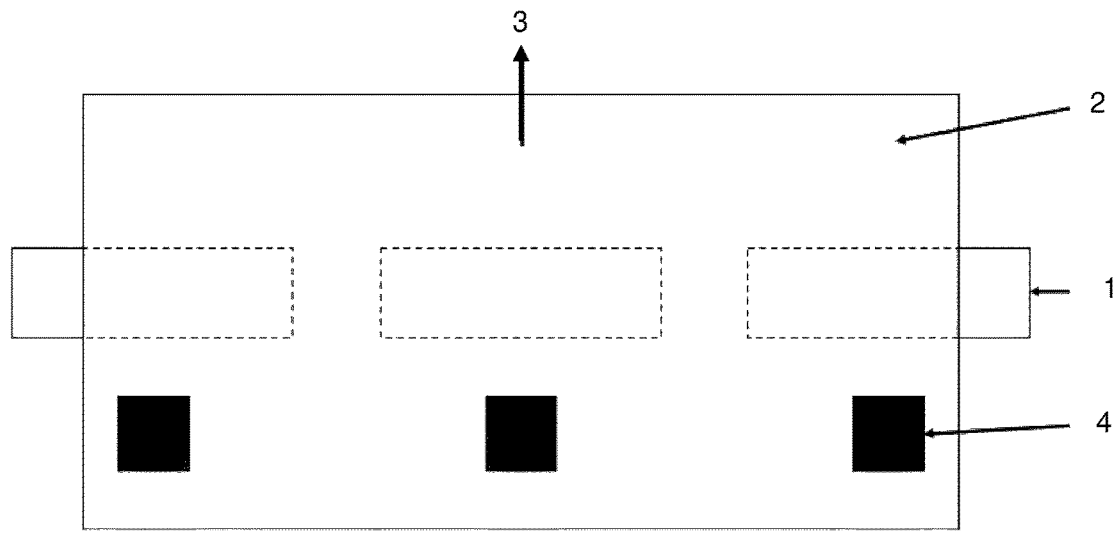

signal of the contact pressure point is generated upon contact and the signal is measured and evaluated.

14 Claims, 4 Drawing Sheets

(51) Int. Cl.
    *B65G 43/02*      (2006.01)
    *G01L 1/22*      (2006.01)

(58) Field of Classification Search
    USPC ....................................................... 198/502.1
    See application file for complete search history.

(56) References Cited

U.S. PATENT DOCUMENTS

| | | | | |
|---|---|---|---|---|
| 9,376,263 | B2 * | 6/2016 | Nancarrow | ............ B65G 43/02 |
| 9,382,070 | B2 * | 7/2016 | Halbritter | .............. B65G 15/64 |
| 9,746,385 | B2 * | 8/2017 | Kar | ........................ G01H 11/08 |
| 2009/0194390 | A1 | 8/2009 | Freeman | |
| 2012/0012443 | A1 | 1/2012 | Sakaguchi | |

FOREIGN PATENT DOCUMENTS

| | | |
|---|---|---|
| DE | 102005021627 A1 | 11/2006 |
| DE | 202008018541 U1 | 8/2015 |
| DE | 102017130104 A1 | 6/2019 |
| DE | 102019126060 A1 | 4/2021 |
| EP | 2316759 A1 | 5/2011 |
| EP | 2386505 A1 | 11/2011 |
| JP | 2010189168 A | 9/2010 |
| WO | 2006119832 A1 | 11/2006 |

* cited by examiner

METHOD AND MEASUREMENT SYSTEM FOR DETECTING AND LOCALIZING INCORRECT POSITIONING OF SUPPORT ROLLERS IN BELT CONVEYOR INSTALLATIONS

The present invention relates to a method and a measurement system for detecting and localizing an incorrect positioning of support rollers in belt conveyor installations.

A correct alignment of the support rollers with respect to the belt is a prerequisite for a trouble-free operation of belt conveyor installations. Incorrect positioning of the support rollers leads to the impairment of the performance of the installation even up to failure and damage of the belt and other components, and thereby causes increased operating costs in terms of a loss of performance and maintenance, for example.

Already known from the prior art are various devices for determining defects on support rollers or support roller stations.

For example, the German utility model DE 20 2008 018 541 U1 describes a device for detecting the position of support roller stations. What is involved here is a system that is integrated in the belt, wherein a magnetic sliding member is movably mounted in a slide channel. If the magnetic sliding member approaches a metal support roller, said sliding member is attracted and deflected by the latter. The alignment of the support rollers can be determined by way of the change in position of the sliding member.

In accordance with the German patent application DE 199 11 640 A1, pressure measurement transducers as well as displacement transducers are permanently installed on the surface of the conveyor belt or in the interior of the conveyor belt. By means of pressure sensors or shear stress sensors, the forces acting on the support rollers are recorded. In this case, an increased force acts on support roller stations that have a vertical misalignment. For the identification of more deeply lying spiral support rollers, a reference load is additionally required.

Additional lateral transducers make possible the identification of spiral support rollers that are shifted on the y-axis.

However, there is no exact description as to how lateral incorrect positioning is determined in detail.

The measurement system described in this case is installed permanently in the interior of the conveyor belt and is not intended for mobile use.

WO 2006/119832 A1 describes a device for monitoring the belt alignment and/or the belt travel by means of pressure sensors or shear stress sensors. When the belt travels over the support roller stations, the pressure or shear stress curve is measured. An atypical curve is an indication of incorrect positioning or bearing damage. The absence of a signal points to missing support rollers or support rollers that are not in contact with the conveyor belt. A misalignment of the conveyor belt, in contrast, is manifested by an increase in the load imposed on one side with simultaneous reduction thereof on the other side.

The sensors of the measurement device are permanently embedded in the conveyor belt.

Also known are methods that enable measurement of the pressure exerted on the belt by bulk material. For example, in tests, a Tekscan sensor was used for investigating the dynamic pressure on a loaded belt conveyor. What is involved here is a sensor mat. This sensor mat is placed on the top side of the conveyor belt and thereby enables the measurement of the interaction between the bulk material and the belt that arises when the belt is opened and closed between the support roller stations. The use of a Tekscan mat makes possible a three-dimensional resolution of the pressure distribution. In addition to the pressure distribution, it is also possible to detect the support roller positions. They are respectively situated at the points with the largest sudden increase in pressure (Xiangwei Liu et al. "Quantification of the pressure distribution on a loaded conveyor belt using a tactile pressure sensor" (Proceedings of the XXI International Conference MHCL 2015)).

Optimally, the normal lines of the support rollers point in the conveying direction. When there are incorrect positionings due to, for example, a rotation of the support rollers around the vertical axis and a camber position, the support roller normal lines deviate from their optimal position in the conveying direction, thereby influencing the belt travel.

A distinction is made between incorrect positioning of individual support rollers and belt misalignment. Belt misalignment, which entails a lateral movement of the drive belts and of the conveyor belt, involves not only individual support rollers, but a plurality of support rollers.

In view of the substantial consequences of incorrect positioning of support rollers in belt conveyor installations, a method as well as a device for detecting incorrect positioning and the localization thereof, that is, for the assignment thereof to specific support rollers or support roller stations is desirable.

In accordance with the invention, a method is provided for determining and localizing incorrect positioning of support rollers in belt conveyor installations, wherein a number of pressure sensors, corresponding at least to the number of support rollers of a support roller station, are arranged spaced apart from one another in a line over the width of the belt on the underside of the belt and, as a sensor is guided over a support roller, a signal of the contact pressure point is generated upon contact and the signal is measured, the sensors being detachably placed on the underside of the belt.

The present invention relates to a method that is easy to use for determining and localizing incorrect positioning of support rollers in belt conveyor installations with the aid of pressure sensors and for evaluating the measurement signals of the pressure sensors and measurement system for this purpose, wherein the measurement system is joined detachably to the belt of the installation and can be used in a mobile manner. In addition, the present invention makes it possible to mount the sensor on the belt without any damage, that is, without the necessity of boring holes and the like for fastening means. A damage-free mounting is advantageous, because it is thereby possible to avoid interventions in the belt that could impair the belt or the operation thereof.

The method according to the invention enables the detection of the support rollers and the alignment thereof as well as the position of the belt on the support rollers to be recorded. For carrying out the method, at least one pressure sensor is assigned to each support roller of a support roller station and, during operation, passes over it. The sensors record the contacts with the support rollers. The measurement signals acquired can subsequently be evaluated and analyzed.

The present invention further relates to a measurement system for carrying out the method according to the invention, wherein the measurement system comprises a unit composed of a number of pressure sensors, wherein the number of pressure sensors corresponds to at least the number of support rollers of a support roller station.

The present invention makes use of the fact that, as a belt passes over the support rollers of a support roller station, a typical pressure is exerted. A deviation from the typical pattern is an indication of a defect.

When the support roller normal lines are aligned correctly in the conveying direction, the sensors pass simultaneously over the individual support rollers of a support roller station, and when, for example, a graphical evaluation is performed, the recorded measurement points appear on a single line at the same height. When a support roller is deflected from the optimal position, the corresponding sensor passes over the deflected support roller earlier or later in time, depending on the direction of deflection, than the pressure sensors pass over the other support rollers of the support roller station in question. The measurement points are displayed correspondingly shifted in a diagram.

Because the conveying speed as well as the number and spacing of the individual support roller stations are known and, in addition, when the sensor passes over the drive, tensioning, or deflecting drums or snub rollers, the pressure points are found to differ from the pressure points when the sensor passes over support rollers, it is possible, on the basis of the measurements, to determine in a simple and straightforward manner not only the presence of an incorrect positioning, but also the position of the support roller in question.

The method and the measurement system according to the invention are suitable, in principle, for all designs of support roller stations, such as, for example, garlands or support roller brackets. In the case of support roller brackets, the individual support rollers are placed in a support frame. In the case of garlands, the support rollers are held at the ends of the axle by way of point connections, so that the garland is attached only to the ends of this chain in the frame.

It is possible in principle to employ all sensors that are capable of measuring a contact pressure on a support roller. Examples of this are membrane buttons, membrane potentiometers, strain gauges, or other types. It is possible to employ a pressure sensor, such as, for example, a Force Sensing Resistor (FSR), the trade name of the company Interlink Electronics.

The sensors should be as thin as possible so as not to influence the guiding of the belt over the support rollers.

In the context of the invention, thin means that, in comparison to the length and width extensions, the thickness is markedly smaller.

The individual sensors are attached in a row, that is, at a height, over the width of the belt web on the underside of the belt, it being possible to choose as needed the distance between the individual sensors and the distance of the terminal sensors with respect to the edge of the belt and likewise the number of individual sensors.

As a rule, at least the distance between the sensors that are assigned to a support roller are the same. It is also possible to choose the spacing distance of all sensors with respect to one another to be the same in the measurement arrangement.

It is obvious that the measurements are found to be more accurate as more sensors are assigned to a support roller.

Particularly for the identification and quantification of a belt misalignment, but also of other incorrect positionings, it is advantageous to furnish the belt with sensors over the belt width. It is obvious that the accuracy of the measurement is dependent on the resolution and on the number of sensors.

The kind of fastening of the sensors on the underside of the belt is essentially not subject to any restrictions. In accordance with the invention, the fastening is detachable, but should nonetheless ensure a secure mounting of the pressure sensors to the underside during operation, even when a load is placed on the belt web. In addition, the fastening should be able to be made without any damage to the belt.

It is possible to use adhesive tapes or the like for fastening. The adhesive tapes can be fabric adhesive tapes. So-called adhesive pads can be used, such as, for example, vacuum pads, etc.

The sensors of a sensor unit can be placed on a support medium, such as a support plate or a support film. In this case, the support medium is to be fastened detachably and preferably free of damage on the underside of the belt. The support medium should be sufficiently flexible so as to be able to adapt to the shape and movement of the belt.

The sensor unit together with its associated leads can be embedded in an elastic layer, such as, for example, in foam rubber or the like.

If a support medium and/or an elastic layer is employed, the individual pressure sensors can be joined to the support medium or to the elastic layer not only detachably, but also permanently, provided that the support medium or the elastic layer can itself be joined detachably to the belt.

For attachment of the support plate on the underside of the belt, it is possible to use the same means of fastening as for the pressure sensors. Furthermore, it is possible to attach the support medium to the edges of the belt using clips or the like, which, without anything further, are again detachable.

Owing to the detachability of the measurement arrangement, a mobile measurement system is created, which can be employed as needed and is not limited to one conveyor installation, such as, for example, those devices that are permanently integrated in belts.

The method according to the invention and the measurement system according to the invention are equally suitable for belt conveyor installations with troughed or non-troughed conveyor belts.

For a support roller station with three support rollers, at least three sensors are needed. In the case of non-troughed support roller stations, such as bottom belt rollers, at least two sensors are needed.

Appropriately, the measurement system comprises means for recording, evaluating, and, in an advantageous manner, storing the measured values. For example, it is possible to connect the sensor arrangement to a computer, which, for example, travels along with the sensor arrangement during the measurement. The recorded measurement signals can be transmitted by means of wireless data transmission to an independent unit for evaluation.

The measuring leads of the individual sensors of a sensor unit open into a common collecting channel, which is connected to means for evaluation of the measurement signals or can be connected to such means.

For the recording of measured values, it is possible to use analog-to-digital convertors or the like. An example for the processing of measured values is a computer or the like. Furthermore, it is possible to employ communication modules, such as WLAN or Bluetooth. For the transmission of data between the individual components, it is possible to employ a bus system.

On the basis of the evaluated measurement signals, it is possible to prepare an installation plan, which reproduces directly the relative position of the belt on the installation as well as the positioning and the presence of the support rollers.

Figure 2:
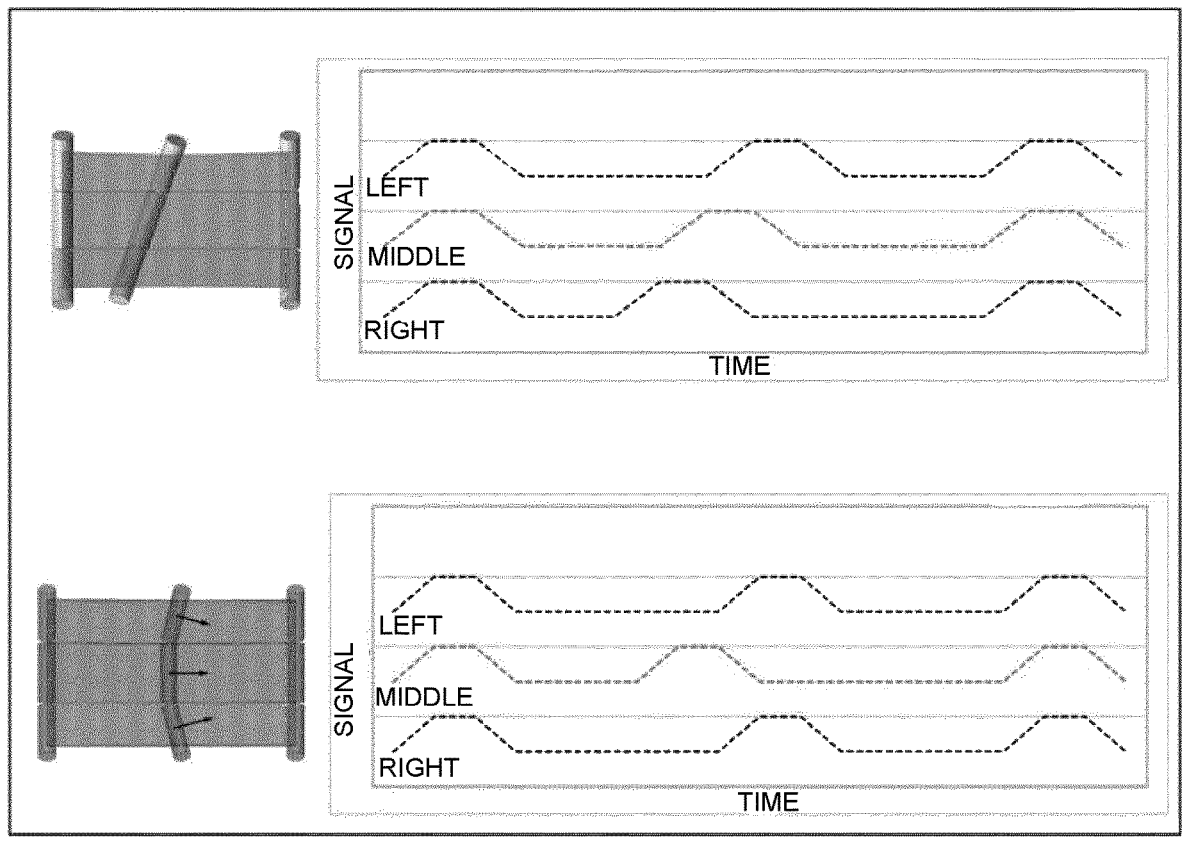
Figure 3:
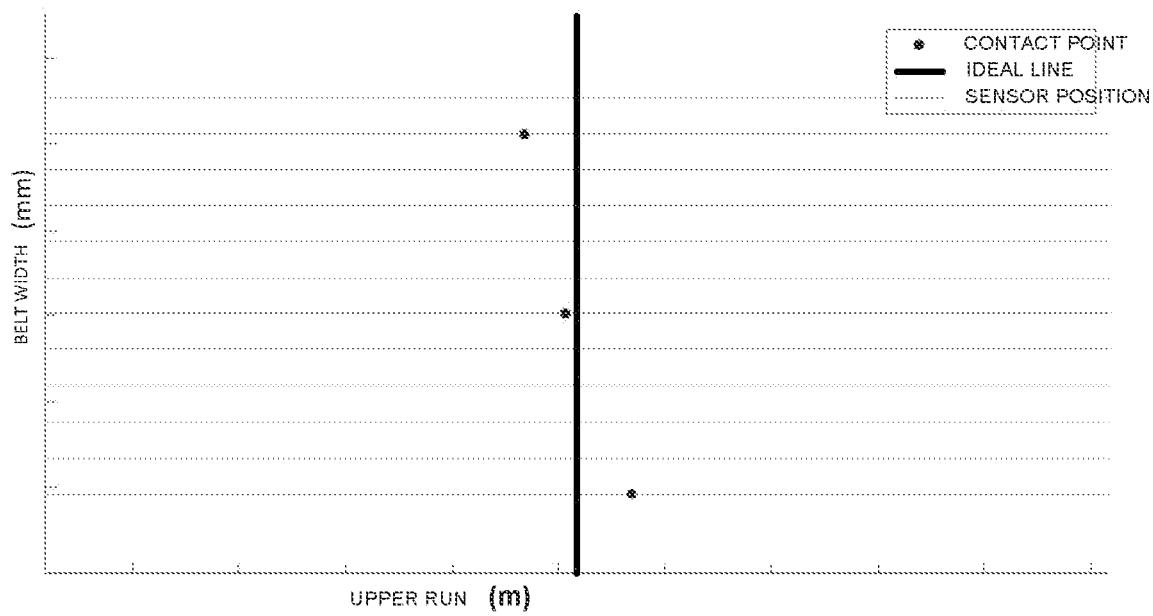
Figure 4:
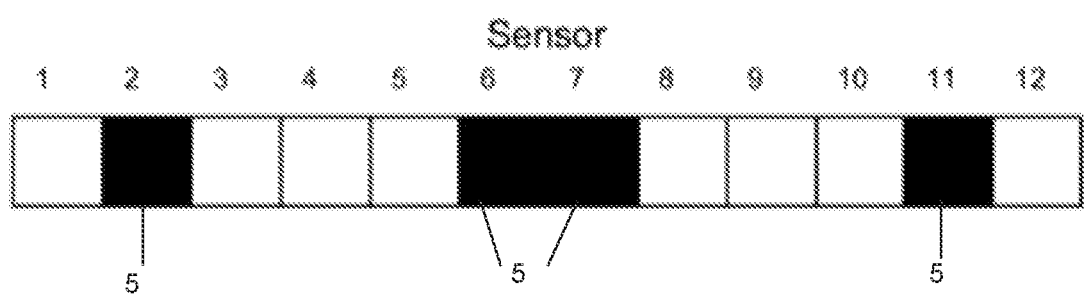
Figure 5:
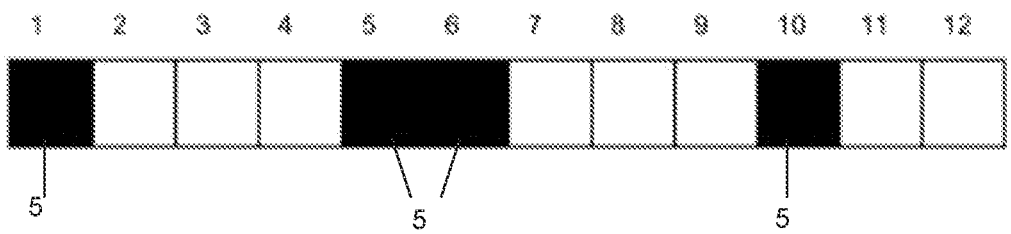
Figure 6:
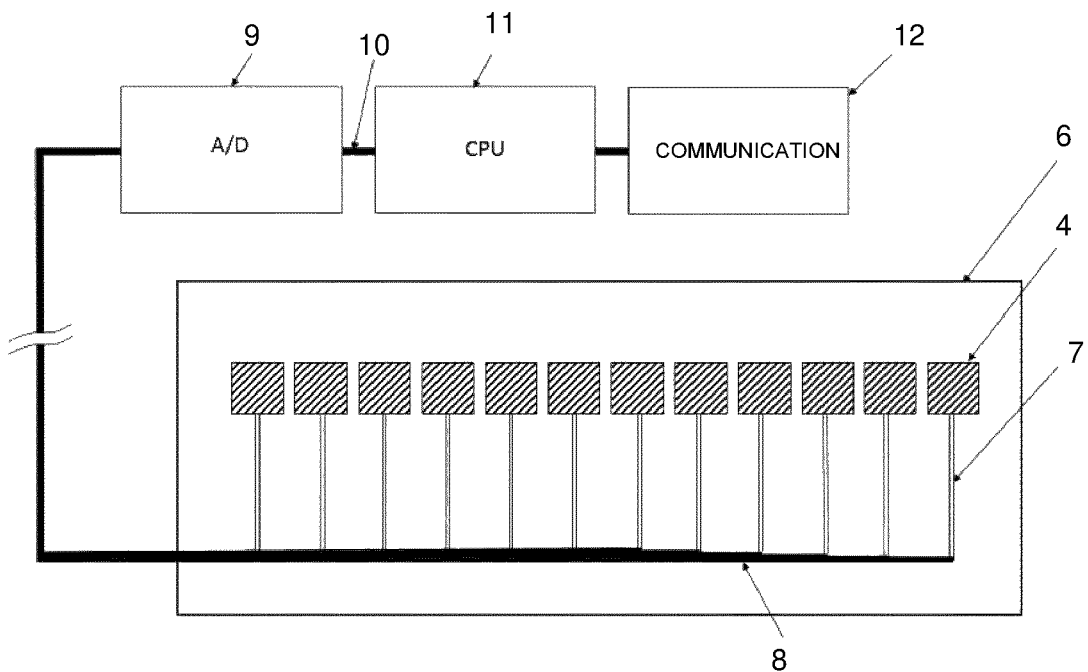
Figure 7:
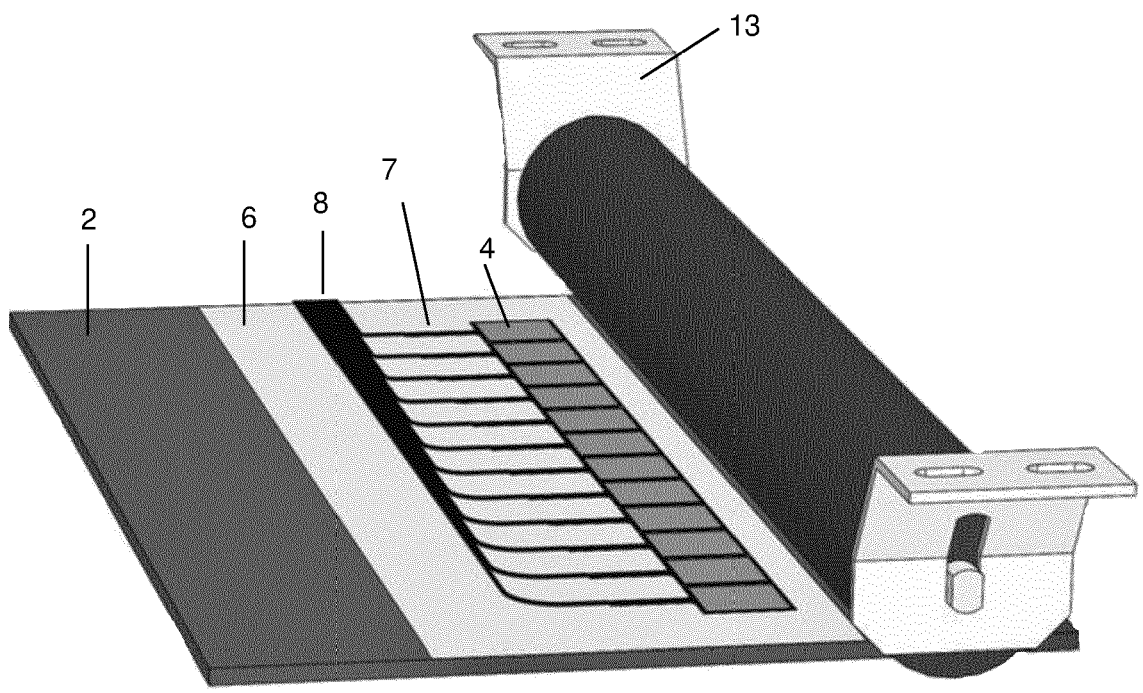
Figure 8:
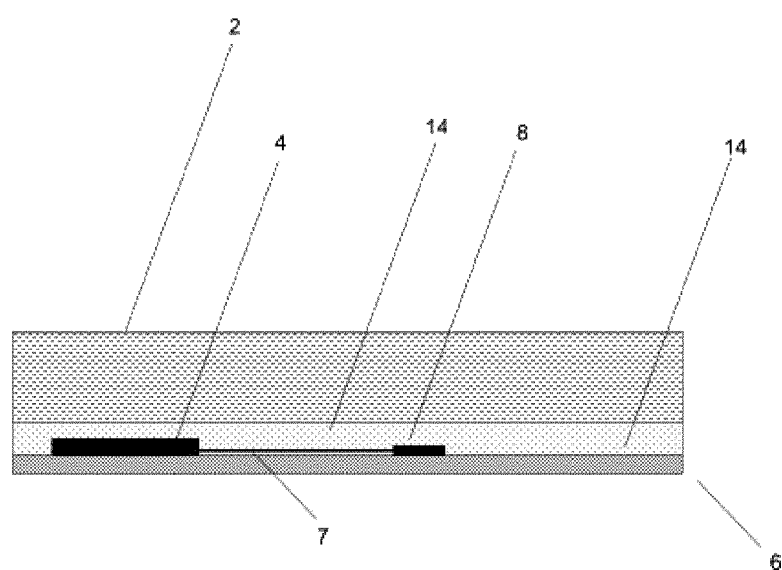

The present invention is illustrated here in detail on the basis of figures. Shown are:

FIG. 1—schematically, a section of a belt with three sensors and of a support roller station with three support rollers;

FIG. 2—incorrect positionings of the support rollers and their characteristic measurement signal;

FIG. 3—contact points with a support roller station that is rotated around the vertical axis;

FIG. 4—the typical contact detection for correctly aligned support rollers and the belt lying in the center of the support roller station;

FIG. 5—an atypical contact detection by a support roller station that is shifted laterally to the left;

FIG. 6—a schematic illustration of a sensor unit that is connected to an evaluation unit; and FIG. 7—a top view onto the underside of a sensor unit as shown in FIG. 6 as it passes a support roller station; and FIG. 8—a cross section through a belt with a sensor arrangement placed on the underside.

Illustrated schematically in FIG. 1 is the structure of the measurement system according to the invention, with optimal alignment of the support rollers 1 and with the support roller normal lines pointing parallel to the running direction 3 of the conveyor belt 2.

In this case, for determining the position of the support rollers 1, at least three sensors 4 are attached on the underside of the belt. The sensors 4 are situated between the belt 2 and the support rollers 1 and measure the contact pressure upon contact with the support rollers 1 during travel over the support rollers 1.

Each support roller 1 is assigned at least one sensor 4. The sensors 4 are arranged in a line at a height along the transverse axis of the conveyor belt 2 at defined spacings.

Preferably, the distances between the individual sensors 4 are the same.

Schematically illustrated in FIG. 2, in the upper depictions, is a support roller station with three support rollers that is rotated around the vertical axis, as well as the characteristic measurement signal thereof.

As shown in the upper left depiction, the arrangement composed of three support rollers 1 is rotated around the vertical axis in the clockwise direction. In consequence thereof, the sensors 4 assigned to the respective support roller 1 pass over the support roller 1 in question, in succession at different time points. Correspondingly, the measurement points are shifted onto a time scale, with the measurement point for the support roller 1, which points backwards in the running direction, being captured prior to the measurement point for the middle support roller and the latter being captured prior to the measurement point for the roller pointing forwards in the running direction.

In contrast to this, the measurement points appear simultaneously in the case of an ideal alignment of the support rollers 1, as depicted in the diagram for the preceding and following support roller station.

Shown in the lower depictions in FIG. 2 is the alignment of the terminal support rollers 1 of a support roller station with a positive camber angle as well as the associated diagram of the measurement points. The support roller station has three support rollers 1, wherein the two terminal support rollers 1 are angled forwards to the transverse axis in the running direction. The running direction of the middle support roller 1 corresponds to the ideal alignment. In the diagram, the measurement points for the terminal support rollers 1 appear shifted in time backwards and, consequently, later than the measurement point for the middle support roller 1. To be seen on the left and right in the diagram are the ideally aligned measurement points for correctly aligned support rollers 1. These measurement points appear on the time scale at the same point in time.

Schematically illustrated in FIG. 3 is a depiction of the belt width over the conveying path, with a specification of the position of the contact points for a roller station that is rotated around the vertical axis. All three measurement points deviate from the ideal line (perpendicular to the conveying path in FIG. 3).

Through interpolation of the measurement points, it is accordingly possible to calculate the angle of rotation for each support roller station individually.

The measurement system according to the invention can also be used to capture the relative position of the belt 2 in relation to the support rollers 1. Assuming that the support roller stations are situated in a line, it is possible to analyze the lateral position of the belt 2, as explained below on the basis of FIGS. 4 and 5.

Schematically illustrated in FIG. 4, is accordingly the contact detection with an arrangement composed of twelve sensors, which are arranged over the belt width. A straight running conveyor belt lies symmetrically in the station when the support roller stations are correctly aligned and, depending on the discretization of the measurement system, has contact with the support rollers at a plurality of sensors. Sensors with contact are depicted in black. The sensors with the numbers 2, 6, 7, and 11 are in contact with points of bending of the belt, where the contact force is smaller. These sensors are depicted in white.

Possibly acting vertical loads can influence the contact pattern in this case. If, for example, bulk material lies on the belt, more sensors 4 come in contact with a support roller 1.

An illustration of the contact detection with shifted support roller stations or a belt 2 that rests eccentrically on the support rollers 1 is shown in FIG. 5. Here, in contrast to FIG. 4, the contact points 5 are unsymmetrically situated with respect to one another (in this case, sensor numbers 1, 5, 6, and 10). The amount by which the belt is relatively situated on the support roller station in this case can be determined all the more precisely, the finer is the resolution of the belt width with sensors.

As already explained above, an incorrect positioning of support rollers can be distinguished from a belt misalignment by regarding the support rollers in the assembly. If individual support rollers stick out owing to an asymmetric contact situation, what is involved here is an incorrect positioning. However, if this situation relates to a plurality of support rollers, what is involved is a belt misalignment. Depending on how many sensors are used and how large the active surface of the individual sensors is, it is possible to make a quantitative statement about the belt misalignment FIG. 6 shows a schematic illustration of a sensor arrangement according to the invention, which is connected to an evaluation station.

The sensor unit has twelve sensors 4, which are placed on support medium 6, such as a support plate or support film. Each sensor 4 is connected via a measurement lead 7 to a collecting channel 8, which, in turn, establishes the connection with an evaluation station. The evaluation station shown in FIG. 6 has a measured value acquisition unit, such as, for example, an analog-to-digital convertor, a bus system 10, and a measured-value processing unit 11, such as, for example, a computer, as well as a communication module 12, which, for example, can operate with WLAN or Bluetooth.

The support plate 6 with the sensor arrangement placed on it is fastened detachably on the underside of a belt 2, preferably without any damage, as illustrated schematically in FIG. 7. Presented in FIG. 7 is a view onto the underside of a belt 2, showing the measurement system according to the invention with the sensors 4 and the support medium 6 as well as the measurement leads 7 and the collecting channel 8 when passing a support roller 1, which is mounted in a support roller station 13.

A cross section through a conveyor belt 2 with a sensor arrangement placed on the underside is shown in FIG. 8.

The sensors 4 with measurement lead 7 and the collecting channel 8 are arranged on a support film 6 and embedded in an elastic layer 14 between the underside of the belt 2 and the support film 6. The elastic layer 14 can be foam rubber or else a comparable elastic material.

The great advantage of the measurement system according to the invention is that, on the one hand, it has a simple design and can be joined detachably to a conveyor belt, so that it can be employed for mobile measurements on more than one conveyor belt installation, and, on the other hand, it can be attached to the belt to be measured, preferably without any damage.

LIST OF REFERENCE CHARACTERS 1 support roller
2 conveyor belt
3 running direction of the conveyor belt
4 sensor
5 contact point
6 support medium
7 measurement leads
8 collecting channel
9 measured-value detection unit
10 bus system
11 measured-value processing unit
12 communication module
13 support roller station
14 elastic layer

What is claimed is:

1. A method for determining and localizing incorrect alignments of support rollers (1) of a support roller station (13) in a belt conveyor installation containing a belt (2), the method comprising the steps of:
placing a number of pressure sensors (4) detachably and without damaging the belt (2) in a line and at a height transversely over the belt width on the underside of the belt (2), wherein the number of the pressure sensors (4) corresponds to at least the number of the support rollers (1) of the support roller station (13) to be measured,
capturing, with the pressure sensors (4), measurement signals of contact pressure in contact with the support roller (1) as the pressure sensors (4) pass over a support roller (1) of a support roller station (13), and,
determining an alignment of the support rollers on the basis of characteristics of pressure point patterns thereby obtained from the captured measurement signals,
wherein said measuring system can be detachably connected to the belt (2) of the belt conveyor installation and can be used for mobile measurements on more than one belt conveyor installation.

2. The method according to claim 1,
wherein the step of determining an alignment of the support rollers further comprises evaluating the captured measurement signals by means of a time scale.

3. The method according to claim 1,
wherein the pressure sensors (4) are chosen from membrane buttons, membrane potentiometers, strain gauges, and Force Sensing Resistors (FSR).

4. The method according to claim 1,
wherein the step of determining an alignment of the support rollers further comprises determining an incorrect positioning of a support roller or a belt misalignment.

5. The method according to claim 1,
wherein the step of capturing the measurement signals further comprises transmitting the captured measurement signals to a system for data processing.

6. A mobile measurement system for determining and localizing incorrect positioning of support rollers (1) of a support roller station (13) in a belt conveyor installation including a belt (2), wherein the measurement system can be used for mobile measurements on more than one belt conveyor installation, wherein the measurement system comprises:
an arrangement of at least two pressure sensors (4) and the total number of the pressure sensors (4) corresponds to at least the number of the support rollers (1) of a support roller station (13) to be measured,
wherein the pressure sensors (4) can be joined, detachably and without damage of the belt (2), to the underside of the belt (2) of the belt conveyor installation.

7. The measurement system according to claim 6,
wherein the pressure sensors (4) are chosen from membrane buttons, membrane potentiometers, strain gauges, and a Force Sensing Resistors (FSR).

8. The measurement system according to claim 6,
wherein the pressure sensors (4) capture measurement signals of contact pressure, and
wherein the measurement system comprises means for the evaluation of the captured measurement signals.

9. The measurement system according to claim 6,
wherein the pressure sensors (4) capture measurement signals of contact pressure, and
wherein the measurement system comprises a computer that is connected to the pressure sensors (4), and that travels along with the pressure sensors (4) during passage of the belt (2) over the support rollers, and that evaluates the captured measurement signals.

10. The measurement system according to claim 6,
wherein means for a wireless transmission of the measurement signals captured by the pressure sensors are provided to a data processing system.

11. The measurement system according to claim 6,
wherein the sensors (4) are placed on a support medium (6).

12. The method of claim 1, wherein step of placing the sensors (4) comprises removably joining the sensors to an outer surface of an underside of the belt (2).

13. The method of claim 4, wherein step of placing the sensors (4) comprises removably joining the sensors to an outer surface of an underside of the belt (2).

14. The method of claim 5, wherein step of placing the sensors (4) comprises removably joining the sensors to an outer surface of an underside of the belt (2).

* * * * *